United States Patent [19]

Schnabel

[11] Patent Number: 5,050,043
[45] Date of Patent: Sep. 17, 1991

[54] SOLID ELECTROLYTE CAPACITOR IN A CHIP STRUCTURE HAVING A FUSED ELEMENT

[75] Inventor: Werner Schnabel, Nattheim, Fed. Rep. of Germany

[73] Assignee: Siemens Aktiengesellschaft, Munich, Fed. Rep. of Germany

[21] Appl. No.: 574,798

[22] Filed: Aug. 30, 1990

[30] Foreign Application Priority Data

Sep. 19, 1989 [DE] Fed. Rep. of Germany ....... 3931246

[51] Int. Cl.$^5$ .................... H01G 1/10; H01G 9/00
[52] U.S. Cl. .................................. 361/534; 361/535; 361/275
[58] Field of Search ............... 361/534, 535, 536, 537, 361/275

[56] References Cited

U.S. PATENT DOCUMENTS 4,121,277 10/1978 Hilbert ............................... 361/433
4,763,228 8/1988 Su ....................................... 361/275
4,989,119 1/1991 Gouvernelle ....................... 361/539

FOREIGN PATENT DOCUMENTS 0232868 8/1987 European Pat. Off. .
3018846 12/1980 Fed. Rep. of Germany .

Primary Examiner—Donald A. Griffin
Assistant Examiner—Le Nguyen
Attorney, Agent, or Firm—Hill, Van Santen, Steadman & Simpson

[57] ABSTRACT

A solid electrolyte capacitor in a chip stucture has a fuse element that is arranged in the anode terminal. What is achieved by applying parting locations in the anode terminal is a current path that extends by way of the anode terminal, the fuse element, an anode wire weld point, an anode wire, a sintered anode member, and a cathode contact to the cathode terminal.

3 Claims, 1 Drawing Sheet

SOLID ELECTROLYTE CAPACITOR IN A CHIP STRUCTURE HAVING A FUSED ELEMENT

BACKGROUND OF THE INVENTION

1. Field of the Invention

The present invention relates to a solid electrolyte capacitor in a chip structure having a fuse element, whereby a sintered anode member having an anode wire sintered thereto is arranged in a system carrier having an anode terminal and a cathode terminal and the structure is covered with a plastic envelope.

2. Description of the Prior Art

The employment of plastic-enveloped solid electrolyte capacitors in professional equipment is not entirely without problems since an ignition and burning of the plastic envelope and damage to neighboring components is possible in case of a short or, respectively, a reversed connection. In order to prevent such damage, components having an integrated fuse are being more and more frequently required by the user.

A solid electrolyte capacitor is already known in the art in which a safety fuse is arranged between the cathode terminal and the cathode content, such as in the German application 25 31 438 C3. This, however, involves wired and relatively-large structures that produce an interruption via a solder bridge in the case of over heating.

Such safety fuses are not suitable, in particular, for miniaturized components in a chip structure.

SUMMARY OF THE INVENTION

It is therefore an object of the present invention to provide a solid electrolyte capacitor that is electrically protected. The above object is achieved, according to the present invention, in that the anode terminal comprises parting locations bridged by the fuse element. Accordingly, a solid electrolyte capacitor in a chip structure comprises a fuse element, a sintered anode member having an anode wire sintered therein is arranged in a system carrier together with an anode terminal and a cathode terminal and has a plastic envelope, and is particularly characterized in that the anode terminal comprises parting locations bridged by the fuse element.

According to a particular feature of the invention, the solid state capacitor, as described above, and according to the present invention, is particularly characterized in that the parting locations are stabilized by a rapid-curing plastic.

A solid electrolyte capacitor in a chip structure and having a fuse element, as set forth above, may be advantageously manufactured by a method which is particularly characterized in that the sintered member is built into a system carrier with a non-parted anode terminal and a cathode terminal, and in that the connection between the anode terminal and the cathode terminal is parted after the sintered member and fuse element have been built in and the parting locations in the anode terminal are cut through, preferably with the assistance of a laser beam.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
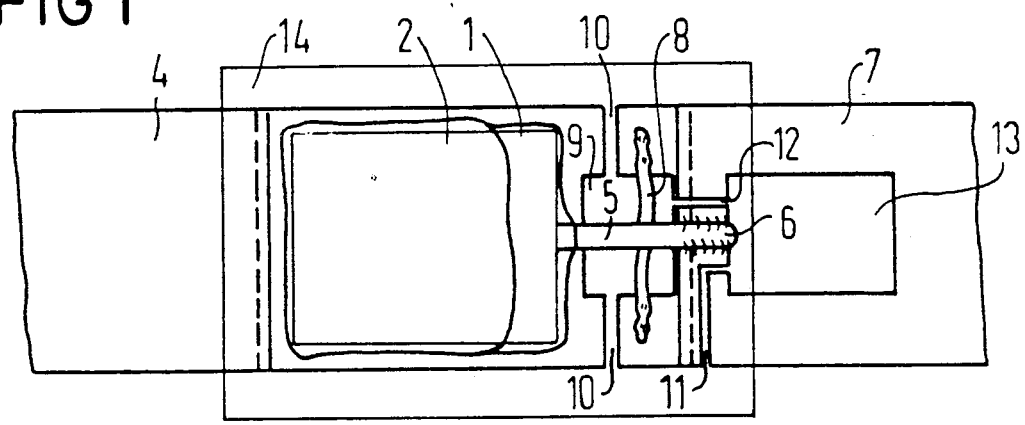
FIG. 1 is a plan view of a solid electrolyte capacitor constructed in accordance with the present invention.

Referring to the drawing, a sintered member 1 composed of a valve metal (electrochemical vent or valve metal), preferably tantalum, is provided with a dielectric acting oxide layer. A solid electrolyte, preferably semiconductor manganese dioxide, serves as a cathode. The solid electrolyte is provided with a cathode contact layer 2 (for example, a conductive layer of silver lacquer) that is connected via a solder layer 3 to the cathode terminal 4.

An anode wire 5 that is composed of the same material as the member 1, here a valve metal, preferably tantalum, is arranged in and sintered to the sinter member 1. The anode wire 5 is connected to the anode terminal 7 via a weld point 6. The anode terminal 7 comprises an opening 9 therethrough that is bridged by a fuse element 8 (for example, a fine fuse wire).

Figure 2:
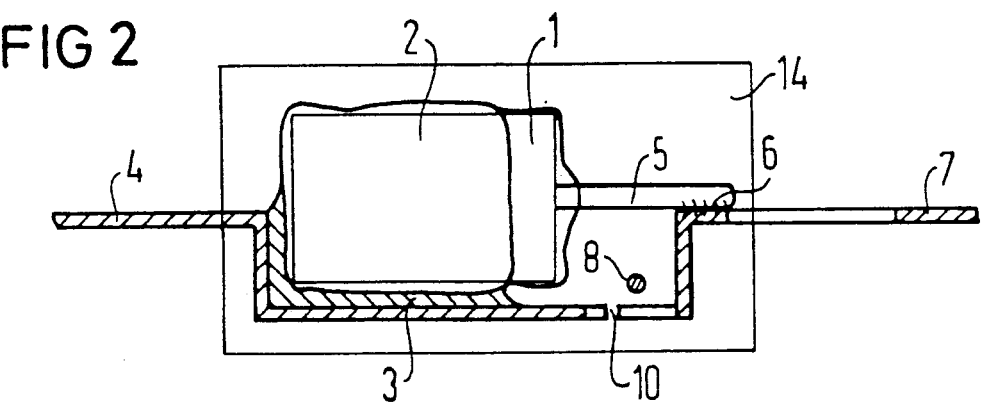
FIG. 2 is a side view of the solid electrolyte capacitor with a fuse element as illustrated in FIG. 1.

As may be particularly derived from FIG. 2, the sintered member 1 is preferably built into a system carrier, whereby the anode terminal 7 and the cathode terminal 7 are connected to one another and are separated at a location 10 only after integration (assembly) has been carried out, i.e. after the manufacture of the solder connection 3 and the weld point 6.

The parting locations 11 and 12 are applied in the anode terminal 7 that has a further opening 13, as also being preferably carried out with the assistance of a laser beam as in the case of the parting location 10. As a result thereof, the fuse element 8 is located between the anode weld point 6 and the exit location of the anode wire 5 from the sintered member 1. A loop-like current path from the anode terminal 7 via the fuse element 8 to the anode wire weld point 6 and, from the latter, via the anode wire 5 to the capacitor element 1 and then to the terminal strip 4 therefore results.

The cut lead, particularly the parting location 11, is executed such that the mechanical stability of the anode terminal 7 is preserved after the manufacture of the envelope 14.

Immediately after the execution of the parting locations 10, 11 and 12, the structural stability can be assured in this region with the assistance of a fast-curing plastic.

With respect to its response behavior, the embodiment of the fuse element 8 depends on the requirements (specifications) on a case-by-case basis.

In addition to the soldering connection 3 between the cathode contact layer and the cathode terminal 4 shown on the drawing, an electrically-conductive glue can also be employed.

After the manufacture of the envelope 14, the anode terminal 7 and the cathode terminal 4 are each bent over by respectively 2×90° onto the seating surface of the chip component against the plastic envelope 14.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a solid electrolyte capacitor in a chip structure and of the type having a fuse element, and in which a sintered anode member has an anode wire sintered therein and extending therefrom and is arranged in a system carrier which includes an anode terminal and a cathode terminal, the cathode terminal being connected to a cathode contact carried by the sintered anode member, and in which a plastic envelope covers the capacitor and the fuse element, the improvement therein comprising:

an opening in the anode terminal;

the fuse element connected across the opening of said anode terminal; and parting locations in said anode terminal at said opening bridged by said fuse element.

2. The improved solid electrolyte capacitor of claim 1, wherein:

said parting locations are covered, secured and stabilized by a rapid-curing plastic.

3. In a method of making a solid electrolyte capacitor of the type having a fuse element and in which a sintered anode member has a cathode contact and has an anode wire sintered therein and extending therefrom and is arranged in a carrier system including an anode terminal, connected to the anode wire, and a cathode terminal connected to the cathode contact, in which the fuse element is connected across an opening in the anode terminal and the anode terminal and the fuse element are separated from the cathode element by gaps in the carrier system, and in which the capacitor and the fuse element are covered with a plastic envelope with the anode and cathode terminals extending therethrough, the improvement comprising the steps of:

providing the carrier system with the anode and cathode elements connected together as an elongate band;

forming first and second openings in the band on opposite sides of the location of the connection of the anode wire to the anode terminal;

after connecting the fuse element across the first opening and prior to covering with the plastic envelope, cutting the band to separate the cathode terminal from the anode terminal at a location between the anode member and the fuse element and cutting the band from the second opening to the first opening and from the second opening to an edge of the band to place the fuse element in series between the anode wire and the anode terminal.

* * * * *